US006628678B2

(12) United States Patent
Temple et al.

(10) Patent No.: US 6,628,678 B2
(45) Date of Patent: *Sep. 30, 2003

(54) DEMULTIPLEXER

(75) Inventors: Daniel Alexander Temple, Dorset (GB); Arthur Simon Waller, Basingstoke (GB); Terrence Ralph Hurley, Newbury (GB)

(73) Assignee: Sony United Kingdom Limited, Weybridge (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,682

(22) Filed: May 6, 1998

(65) Prior Publication Data

US 2003/0147430 A1 Aug. 7, 2003

(30) Foreign Application Priority Data

May 21, 1997 (GB) .............................................. 9710460

(51) Int. Cl.⁷ .............................................. H04L 12/56
(52) U.S. Cl. ..................................... 370/536; 370/395.1
(58) Field of Search ................................ 370/536, 542, 370/395.1, 395.64, 389; 348/385.1, 423

(56) References Cited

U.S. PATENT DOCUMENTS

| 5,521,918 A | * | 5/1996 | Kim ............................ 348/423 |
| 5,533,021 A | | 7/1996 | Branstad et al. |
| 5,544,161 A | | 8/1996 | Bigham et al. ............. 370/58.1 |
| 5,559,999 A | * | 9/1996 | Maturi et al. ................ 370/389 |
| 5,563,884 A | | 10/1996 | Fimoff et al. ................... 370/84 |
| 5,652,749 A | * | 7/1997 | Davenport et al. .......... 370/466 |
| 5,666,487 A | * | 9/1997 | Goodman et al. ........... 370/395 |
| 5,828,414 A | * | 10/1998 | Perkins et al. .............. 348/423 |
| 5,856,973 A | * | 1/1999 | Thompson ................... 370/389 |
| 5,959,659 A | * | 9/1999 | Dokic ............................. 348/7 |
| 5,966,385 A | * | 10/1999 | Fujii et al. .................... 370/465 |
| 5,966,387 A | * | 10/1999 | Cloutier ....................... 370/516 |
| 5,978,855 A | * | 11/1999 | Metz et al. .................. 709/249 |
| 6,097,739 A | * | 8/2000 | Yamashita ................... 370/528 |
| 6,339,597 B1 | * | 1/2002 | Osaki .......................... 370/395 |

FOREIGN PATENT DOCUMENTS

EP          0 752 802          1/1997

* cited by examiner

*Primary Examiner*—Kenneth Vanderpuye
(74) *Attorney, Agent, or Firm*—Frommer Lawrence & Haug LLP; William S. Frommer

(57) ABSTRACT

A demultiplexer for selectively demultiplexing ATM signals and MPEG signals received at an input of the demultiplexer, the demultiplexer comprising an MPEG demultiplexer for demultiplexing an MPEG transport stream, an ATM section for identifying MPEG transport stream data in an ATM signal, and a selection unit for selectively connecting the input to the MPEG demultiplexer or the ATM section according to whether the received signal is an MPEG signal or an ATM signal, wherein the demultiplexer comprises a memory shared between the demultiplexer and the ATM section and the ATM section processes ATM signals by storing the received signals in the memory and providing the MPEG demultiplexer with addresses appropriate for the MPEG demultiplexer to retrieve demultiplexed data from the memory.

7 Claims, 3 Drawing Sheets

DEMULTIPLEXER

BACKGROUND OF THE INVENTION

1. Field of the Invention

The present invention relates to a demultiplexer, in particular for a so-called set top box (STB) for decoding digital signals transmitted over a cable and/or satellite network.

2. Description of the Related Art

Standards for broadcasting digital video have been established in recent years. These standards have utilised MPEG-2 transport streams with audio and video compression technologies and data packet formatting (see ISO-IEC 13818-1,2 and 3). The initial implementations of digital transmission over networks were to be used in "broadcast" transmissions where the same signal was to be transmitted to all receivers in the network. However, it is expected that "narrowcast" transmissions will be introduced such that a signal is transmitted over the network for reception by one receiver only. This technique is particularly applicable to so-called "video-on-demand". It is therefore necessary to provide set top boxes which are capable of receiving both broadcast and narrowcast (e.g. Asynchronous Transfer Mode, ATM) signals.

Broadcast (e.g. MPEG-TS) and narrowcast signals are encoded in different formats and require separate decoders to convert the transmitted signals back to the basic MPEG video signal. This is not desirable as it adds to the cost of the set top box and the complexity of manufacture. As the set top box is intended to be for mass production, it is clearly desirable to minimise the cost while still providing the facility to receive narrowcast-type services.

SUMMARY OF THE INVENTION

According to the present invention there is provided a demultiplexer for selectively demultiplexing ATM type signals and MPEG type signals received at an input of the demultiplexer, the demultiplexer comprising:

an MPEG demultiplexer for demultiplexing an MPEG transport stream;

an ATM section for identifying MPEG transport stream data in an ATM type signal; and means for selectively connecting the input to the MPEG demultiplexer or the ATM section according to whether the received signal is an MPEG type signal or an ATM type signal; wherein the demultiplexer comprises a memory shared between the demultiplexer and the ATM section and the ATM section processes ATM type signals by storing the received signals in the memory and providing the MPEG demultiplexer with addresses appropriate for the MPEG demultiplexer to retrieve demultiplexed data from the memory.

According to the present invention, there is also provided a method of demultiplexing ATM type signals comprising;

storing the signal data in a memory;

examining the stored signal data;

identifying MPEG transport stream data in the stored signal data by means of addresses; and recovering demultiplexed MPEG data by retrieving appropriate stored data on the basis of said addresses.

In this way, processing efficiency may be dramatically improved. In contrast to previous proposals, the data need not be successively read, processed and rewritten, since only pointers to the common memory need be passed between consecutive processors. Furthermore, when demultiplexing ATM type signals, both processing sections need not operate at full power, since some of the processing conducted by the ATM section can be made use of by the MPEG demultiplexer thereby reducing its operations. Finally, the overall memory requirements are reduced.

Preferably, the demultiplexer is provided as a single integrated circuit. This further reduces the need for input/output pins in the overall set-top box circuit.

DETAILED DESCRIPTION OF THE PREFERRED EMBODIMENTS

A specific embodiment of the present invention will now be described by way of example with reference to the accompanying drawings.

Broadcast transmissions comprise one or more video signals from which the user may select one signal to watch. In this mode the user has no control over when and which signals are sent. Therefore, when such signals are received at the home terminal, the terminal must separate the chosen signal from those signals which are unwanted.

In contrast to this, with a narrowcast transmission, the user may have some control over the data being transmitted. For example, with the so-called video-on-demand system, the user can request a particular program to be transmitted to him over the network. The data for this program may be transmitted in a digital channel containing the data requested as well as data for other users. The home terminal must therefore selectively retrieve the packets of data relating to the program requested by the user.

In a system comprising both narrowcast and broadcast signals, the user signals may be combined and transmitted in the same channels, requiring additional processing to separate the narrowcast and broadcast signals.

It is proposed to encode data from both types of source in the same format. A coding format which may be used, and which meets the ISO standard referred to above, is the MPEG-2 transport stream (MPEG-2 TS).

Figure 3:
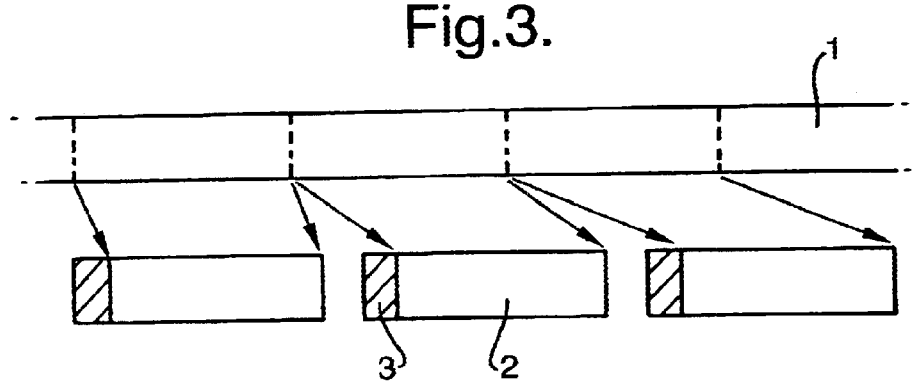
FIG. 3 shows the format of the transmission signals used for narrowcast transmission.

In a broadcast system, the coding of the video signals, is achieved by converting the video images into a stream of digital MPEG video data. As shown in FIG. 3, this stream of data 1 is then divided into blocks 2 to which a header 3 is appended to provide transmission blocks of an MPEG-2 transport stream. These blocks are then transmitted over the network for reception by the home terminal (set top box) of the user.

Figure 4:
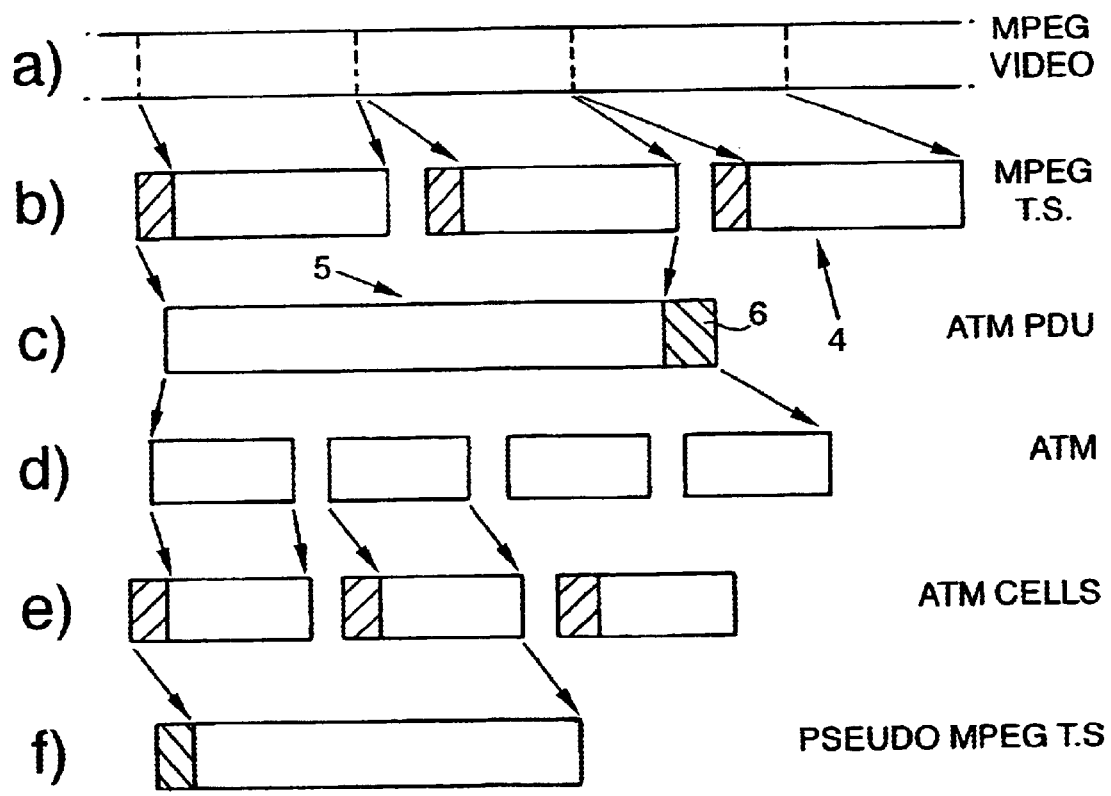
FIG. 4 shows the signal format used in broadcast transmission.

The coding system used for narrowcast transmissions is somewhat more complicated and is illustrated in FIG. 4. The video signals are again MPEG coded and this MPEG signal is divided into blocks of data of an MPEG transport stream. One or more transmission blocks 4 of the MPEG transport stream are combined with a trailer 6 and possibly some additional dummy data to form an ATM protocol data unit (PDU) 5. These PDUs are then divided into one or more smaller blocks and each of these smaller blocks is provided with a header including destination address information. The destination address information relates to an address of the intended recipient or recipients. The resultant boxes with headers attached are known as ATM cells and provide the data for narrowcast transmission. However, in order to transmit the ATM cells over the network without having overly complicated hardware, the ATM cells are further coded using the same format as the MPEG transport stream to provide a pseudo MPEG transport stream. This pseudo MPEG transport stream may be transmitted over the network along with the broadcast MPEG-TS.

Figure 1:
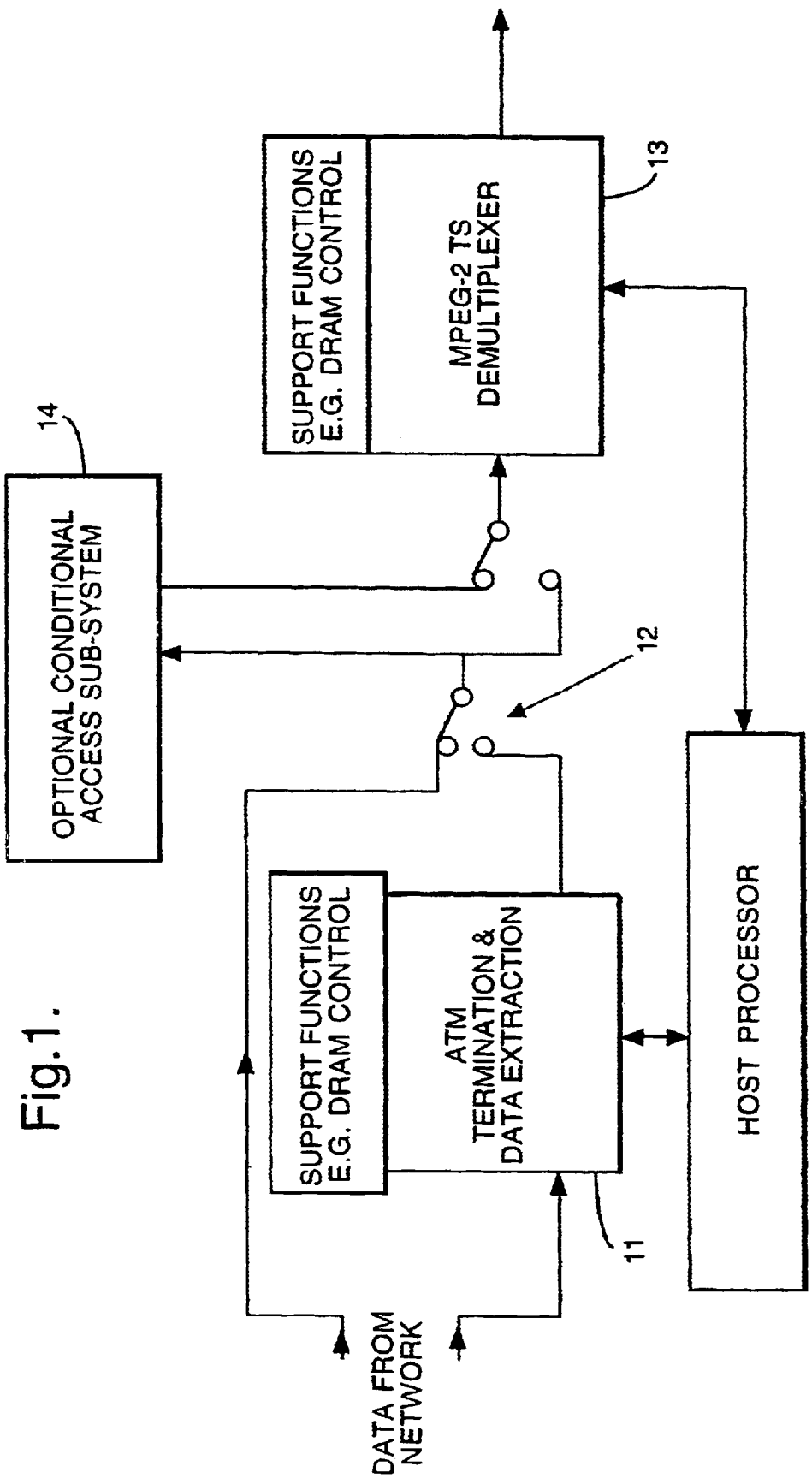
FIG. 1 shows a schematic of the processing stages of a narrowcast/broadcast receiver.

In order to decode both narrowcast and broadcast signals, it is possible to use a system such as that shown in FIG. 1.

The MPEG transport stream or pseudo MPEG transport stream signal (FIG. 4(f)) received from the network is received by the set top box. The type of signal (i.e. broadcast or narrowcast) is determined either on the basis of the selected channel (such that certain channels contain one or the other type of signal), or by passing the signal to a narrowcast/broadcast detector which determines whether narrowcast or broadcast signals are being received. The detector controls the selector 12 to alter the source of data accordingly. In particular, the selector 12 can be controlled to receive data directly from the input to the set top box in the case of broadcast reception or from an ATM termination and data extractor unit 11 in the case of narrowcast transmission.

The ATM termination and data extraction unit 11 extracts the ATM cells (FIG. 4(e)) from the pseudo MPEG transport stream, then accordingly routes the ATM cells to the appropriate destination address encoded in the headers of the ATM cells. Those ATM cells with a destination address corresponding to the current virtual connection have their headers stripped off and the remaining parts (FIG. 4(d)) of those cells are assembled into PDUs (FIG. 4(c)). Finally, the ATM termination and data extraction unit 11 converts the PDUs back into an MPEG transport stream (FIG. 4(b)) representing the signal to be passed through the, virtual connection.

Finally, the output from the selector 12 is fed to an MPEG-2 transport stream demultiplexer 13, possibly via a conditional access sub system 14. At this stage, where the received signal is a broadcast signal, the MPEG-2 TS demultiplexer separates the required individual program from the overall multiplex of programs received.

Whilst the system shown in FIG. 1 is capable of receiving both narrowcast and broadcast signals, there are a number of drawbacks associated with it. In particular, where the set top box is receiving narrowcast signals, the ATM termination and data extraction unit 11 processes large quantities of data. However, when the signal received by a set top box is a broadcast signal the ATM termination data extraction unit is by-passed and therefore not required for processing the signal. In contrast, where the signal received by a set top box is a narrowcast signal, the MPEG-2 TS demultiplexer receives from the ATM termination and data extraction unit, an MPEG-2 transport stream which contains data corresponding to the required video, audio etc signal only. Thus the MPEG-2 TS demultiplexer does little more than simply pass the data from its input to its output. In contrast, when the set top box receives a broadcast signal, the MPEG-2 TS demultiplexer has to process the received multiplex signal and extract from that the required signal. This arrangement means that for a given narrowcast or broadcast signal one of the ATM termination and data extraction unit and the MPEG-2 TS demultiplexer unit is practically idle whilst the other is processing a large quantity of data.

There are further inefficiencies in the system in that both the ATM termination and data extraction units and the demultiplexer must have their own processing and other support functions to process the data. Furthermore, in order to process video signals which may be fed at very high data rates, it is inefficient to have two separate stages of processing. This involves storing the incoming data in a buffer, processing it, storing the output in a second buffer, reading it from the second buffer, carrying out the second processing stage and finally storing this in an output buffer to be fed out of the output of the system. At high data rates the read and write times of memory devices becomes significant such that it is clearly inefficient to carry out read and write operations twice. Consequently the device has a limited data through put or must include faster memory which is expensive.

Figure 2:
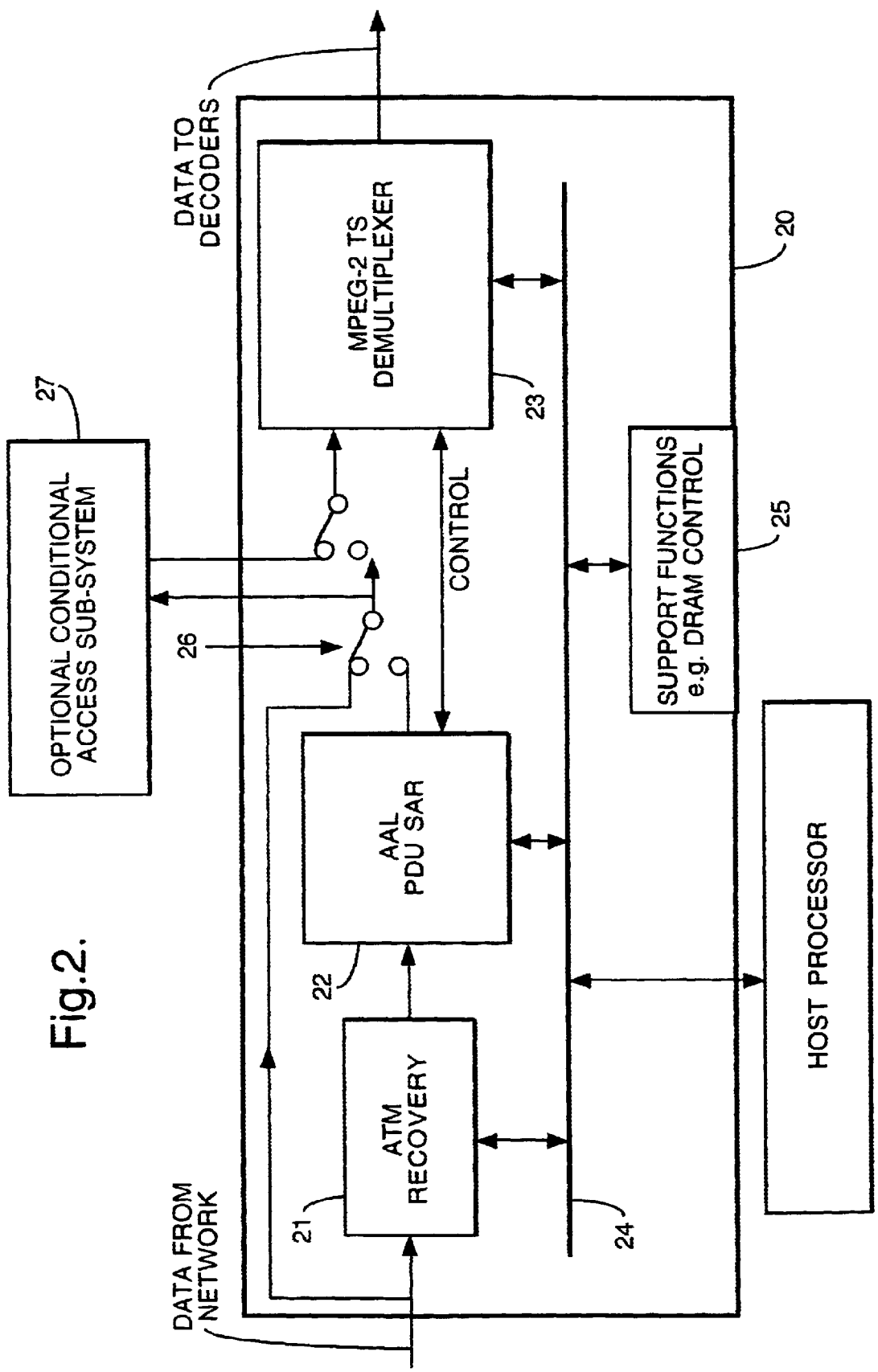
FIG. 2 shows a schematic implementation of the present invention.

FIG. 2 illustrates a single demultiplexer unit 20 according to an embodiment of the present invention. This single unit is capable of demultiplexing both MPEG and pseudo MPEG transport stream. The functional blocks shown in FIG. 2 represent stages of processing rather than physical processing stages.

The demultiplexer 20 of the illustrated embodiment comprises an ATM recovery section 21 which is designed to recover the ATM cells (FIG. 4(e)) from pseudo MPEG transport stream packets (FIGS. 4(f)). It is of course possible that a network would transmit ATM packets "raw" rather than embedded in pseudo MPEG transport streams as described above. In this case, the ATM recovery section 21 need not be included or could be bypassed.

An AAL PDU SAR unit 22 operates to recover the ATM PDU data. However, unlike the previously described system, the data itself is not transferred between the ATM recovery section 21 and the AAL PDU SAR section 22, nor is it passed from the AAL PDU SAR unit 22 to the following MPEG-2 TS multiplexer 23.

When the ATM recovery unit 21 forms ATM cells (FIG. 4(e)) from the pseudo MPEG transport stream (FIG. 4(f)) received from the network, the data is transferred via bus 24 to a common unit 25 containing a central memory. Thus, whereas the previously described system would store the pseudo MPEG transport stream (FIG. 4(f)) into a memory and then selectively read that data from the memory so as to form the ATM cells (FIG. 4(e)), this embodiment need only identify the appropriate parts of the data stored in the central memory corresponding to the ATM cells. In other words, the ATM recovery unit 21 need only send address data to the AAL PDU SAR unit 22 indicating at what addresses of the central memory the data of the ATM cells may be found.

In the same way, according to this embodiment, the AAL PDU SAR unit 22 need not write ATM cells (FIG. 4(e)) into a memory, read data from the memory to form ATM packets (FIG. 4(d)), rewrite those packets to the memory, read appropriate data to form ATM PDUs (FIG. 4(c)), rewrite the ATM PDUs and read appropriate data to form an MPEG transport stream (FIG. 4(b)). Instead, the AAL PDU SAR may merely process the data stored in the central memory to identify, by address, those parts of the data required for the MPEG transport stream. Of course, in processing the data, any additional required header data or correction data can be supplied to the central memory 25. In this way, by merely transferring appropriate control and address data to the MPEG-2 TS demultiplexer 23, the MPEG-2 TS demultiplexer may merely access the required data from the central memory according to the supplied addresses.

Thus, broadcast signals which are received as MPEG transport streams (FIG. 4(b)) are routed directly to the MPEG-2 TS demultiplexer 23 via a selection unit 26 in the same way as described for the system of FIG. 1. However, when a narrowcast signal is received as a pseudo MPEG transport stream (FIG. 4 (f)), this data is stored in a central memory and successive processing through the demultiplexer 20 is achieved by passing on appropriate pointers or addresses for that memory, thereby avoiding many reading and writing steps of the data and transfer of the data itself between successive processing units. At each stage, the processing is therefore reduced. In particular, when a narrowcast signal is being received such that the ATM recovery unit 21 and the AAL PDU SAR unit 22 have to operate, operation of the MPEG-2 TS demultiplexer 23 may be reduced, since it need only retrieve appropriate data from that stored in the memory according to the addresses passed to it from the AAL PDU SAR unit 22.

Although the demultiplexer is described above as storing the received data before determining the addresses of the appropriate MPEG-TS data, the data may simply be examined on-the-fly, in other words in real time, and the desired data fed to the output and the other data directed to decoders in the demultiplexer or discarded accordingly.

In the illustrated embodiment, a conditional access sub system 27 is connected to the demultiplexer 20. This is optional and might typically be a coded system such that access to certain signals is restricted to particular users.

The system is preferably provided on a single integrated circuit. This is particularly advantageous in view of the advances made by using a single central memory for both the ATM and MPEG processing. Furthermore, it reduces the overall manufacturing costs and minimises the number of pins required on the integrated circuit for input and output of information.

Whilst the present invention is suitable for transmission of signals over satellite or cable networks, it is equally applicable to other networks such as terrestrial broadcast or MMDS.

What is claimed is:

1. A demultiplexer for selectively demultiplexing ATM signals and MPEG signals received at an input of the demultiplexer, the demultiplexer comprising:
    an MPEG demultiplexer for demultiplexing an MPEG transport stream;
    an ATM section for identifying MPEG transport stream data in an ATM signal; and
    means for selectively connecting the input to the MPEG demultiplexer or the ATM section according to whether the received signal is an MPEG signal or an ATM signal,
    wherein the demultiplexer includes a memory shared between the MPEG demultiplexer and the ATM section, and the ATM section processes ATM signals by storing the received signals in the memory, and providing the MPEG demultiplexer with addresses appropriate for the MPEG demultiplexer to retrieve demultiplexed data from the memory.

2. A demultiplexer according to claim 1, wherein the ATM section includes means for recovering ATM PDUs from ATM cells and for identifying the ATM PDUs by appropriate addresses for the memory.

3. A demultiplexer according to claim 2, wherein the ATM section includes means for recovering ATM cells from a pseudo MPEG transport stream and for identifying the ATM cells by appropriate addresses for the memory.

4. A demultiplexer according to claim 1, wherein the ATM section and MPEG demultiplexer are connected to the memory via a common data bus.

5. A demultiplexer according to claim 1 wherein, the demultiplexer is formed as a single integrated circuit.

6. A television decoding apparatus including a demultiplexer according to claim 1.

7. A method for selectively demultiplexing ATM signals and MPEG signals received at an input of a demultiplexer, comprising the steps of:
    selectively connecting the input to a MPEG demultiplexer or an ATM section according to whether the received signal is an MPEG signal or an ATM signal;
    demultiplexing an MPEG transport stream using the MPEG demultiplexer; and
    identifying MPEG transport stream data in an ATM signal using the ATM section,
    processing the ATM signals by the ATM section by storing the received signals in a memory, and
    providing the MPEG demultiplexer with addresses appropriate for the MPEG demultiplexer to retrieve demultiplexed data from the memory.

* * * * *